UNITED STATES PATENT OFFICE.

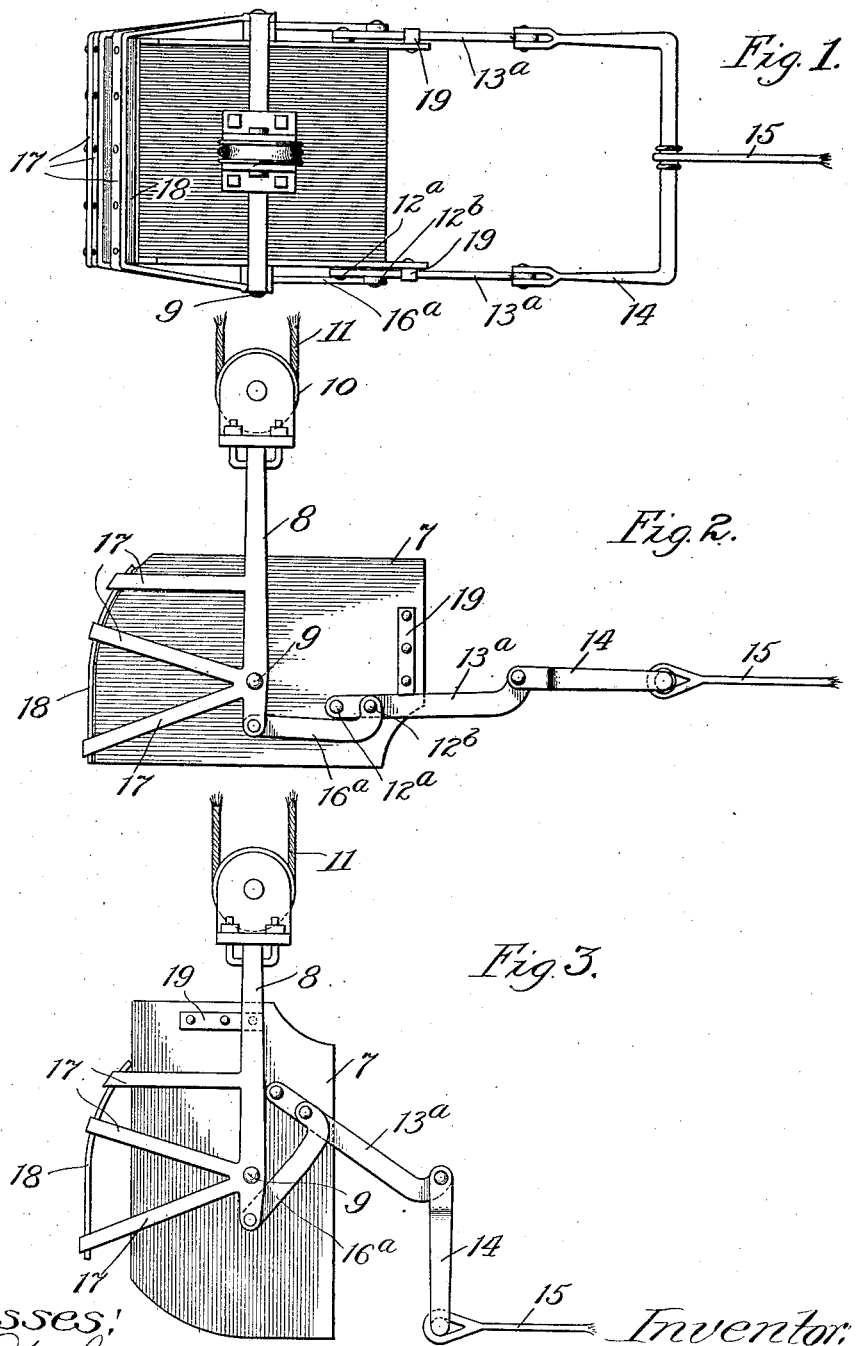

HENRY G. BUTLER, OF KENOSHA, WISCONSIN.

EXCAVATING-SHOVEL.

No. 923,405.  Specification of Letters Patent.  Patented June 1, 1909.

Application filed August 8, 1906. Serial No. 329,686.

*To all whom it may concern:*

Be it known that I, HENRY G. BUTLER, a citizen of the United States, residing at Kenosha, in the county of Kenosha and State of Wisconsin, have invented a new and useful Improvement in Excavating-Shovels, of which the following is a specification.

My invention relates to an improvement in the class of excavating-shovel which is adapted to be suspended at its pivoted suspension-bail from a derrick, or cable, at a pulley, to be raised and lowered by the suspending medium, and provided with a draft-rigging, connected with a suitable windlass, or other power device, for dragging the shovel to fill it, for controlling the dumping of the shovel by permitting it to turn on its pivotal connection with the suspension-bail, and for maintaining the shovel in its proper horizontal condition in transporting it from the filling position to the place of dumping.

The object of my invention is to provide a construction by which the shovel can be controlled in its operation, by the hoisting cable and pulling cable and by which a shovel open at both ends may be employed.

Referring to the accompanying drawings—Figure 1 is a plan view of an excavating-shovel provided with my improvement; Fig. 2, a view in side elevation of the same, and Fig. 3 a similar view of the same, though showing the shovel in its position of dumping.

The shovel proper, represented at 7 in the drawings, may be of any desired or suitable form and construction, and is adapted for discharging the load at its rear end, which latter is closed during filling and transportation, as hereinafter described. A suspension-bail 8 straddles the shovel and has its arms pivotally connected with the sides thereof as at 9, 9, but forward of the center of gravity of the shovel, when loaded; the pivots being located between the ends of the bail-arms and preferably near their lower ends, to constitute the bail a lever of the first class. The bail carries a sheave 10, by which to suspend it through the medium of a rope, or cable, 11. Near the forward end of each side of the shovel is pivoted at one of its ends as represented at 12$^a$, a lever 13$^a$, these levers 13$^a$ being connected at their outer ends by a hauling-bail 14 pivotally joined to them to afford the draft-rigging, and a rope, or cable, 15 connects the hauling-bail 14 with a windlass, or other power device (not shown). A link 16$^a$ connects the suspension-bail 8 and one of the levers 13$^a$ at each side of the shovel, the inner end of each link 16$^a$ being pivotally connected with a lower end of the suspension-bail 8 below its pivotal point 9, while the outer end of each link is pivoted to a lever 13$^a$ at a point in advance of its pivot 12$^a$.

The operation of this device will be readily apparent. When excavating earth, or other material, the shovel is dragged, in the position represented in Fig. 2, or in approximately a horizontal position, by the pull exerted on the rope 15. After the shovel has been filled, it is raised by the rope 11, while the rope 15 is maintained taut, thereby tending to turn the levers 13$^a$ on their pivots, and to accordingly force the links 16$^a$ against the arms of the suspension-bail 8, with which they are connected, with the obvious effect of retaining the loaded shovel in a horizontal position while it is being transported from the point of filling to the point of dumping, as for instance a spoil-bank. The arms of the bail 8 are represented as carrying, through the medium of branches 17 extending from them, a back 18 for closing the rear open end of the shovel when in its position for filling or transportation. Upon reaching the point of discharge, or place of dumping, the rope 15 is slacked, thereby removing the strain which holds the shovel in a horizontal position, and the weight of the load turns the shovel backward on its fulcrum 9, away from the end 18, to the dumping position represented in Fig. 3, where the load is free to slide from the shovel.

In Fig. 2 is represented a stop-bar 19, one being provided on the outer surface of each side of the shovel, near its forward end, to be engaged by the respective lever 13$^a$ and prevent it from being turned unduly in an upward direction on its fulcrum.

What I claim as new, and desire to secure by Letters Patent, is—

1. The combination with an excavating-shovel open at both ends, of a draft-rigging pivoted to the shovel near its forward end, a suspension-bail pivoted to the shovel forward of its center of gravity when loaded, links pivotally connecting said draft-rigging with said suspension-bail, and an end carried by said suspension-bail, adapted to close the rear open end of the shovel when in a filling position.

2. The combination with an excavating-shovel open at both ends, of a draft-rigging pivoted to the shovel near its forward end, a suspension-bail pivoted near its lower ends to the shovel forward of the center of gravity when loaded, links pivoted at their forward ends to the draft-rigging in advance of the pivots of the latter and at their rear ends to the suspension-bail below the pivo of the latter, branches extending back from the suspension-bail, and a back secured to said branches and adapted to close the rear open end of the shovel when the latter is in a filling position.

HENRY G. BUTLER.

In the presence of:
A. U. THORIEN,
C. W. WASHBURNE.